US010733029B2

(12) United States Patent
Kumar Shimoga Manjunatha et al.

(10) Patent No.: US 10,733,029 B2
(45) Date of Patent: Aug. 4, 2020

(54) MOVEMENT OF SERVICES ACROSS CLUSTERS

(71) Applicant: Hewlett Packard Enterprise Development LP, Houston, TX (US)

(72) Inventors: Praveen Kumar Shimoga Manjunatha, Bangalore (IN); Ravikumar Vallabhu, Bangalore (IN)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 100 days.

(21) Appl. No.: 16/050,941

(22) Filed: Jul. 31, 2018

(65) Prior Publication Data
US 2020/0042364 A1 Feb. 6, 2020

(51) Int. Cl.
G06F 9/50 (2006.01)
G06F 9/48 (2006.01)
H04L 29/12 (2006.01)
H04L 12/24 (2006.01)
H04L 29/08 (2006.01)
H04L 29/06 (2006.01)

(52) U.S. Cl.
CPC .......... *G06F 9/5083* (2013.01); *G06F 9/4856* (2013.01); *G06F 9/5072* (2013.01); *G06F 9/5077* (2013.01); *H04L 41/0893* (2013.01); *H04L 61/2007* (2013.01); *H04L 67/1008* (2013.01); *G06F 2209/503* (2013.01); *G06F 2209/508* (2013.01); *H04L 63/102* (2013.01)

(58) Field of Classification Search
CPC ... H04L 67/10; H04L 67/1002; G06F 9/5077; G06F 11/3006; G06F 9/50; G06F 9/4856
See application file for complete search history.

(56) References Cited

U.S. PATENT DOCUMENTS

| | | | |
|---|---|---|---|
| 8,719,415 B1 | 5/2014 | Sirota et al. | |
| 9,009,294 B2 | 4/2015 | Dawson et al. | |
| 9,239,996 B2 | 1/2016 | Moorthi et al. | |
| 9,628,404 B1 * | 4/2017 | Goffinet | G06F 16/2358 |
| 9,699,114 B1 | 7/2017 | Hintermeister et al. | |
| 9,948,514 B2 | 4/2018 | Kansal et al. | |
| 10,178,021 B1 * | 1/2019 | Devillard | H04L 41/0816 |
| 2005/0278453 A1 * | 12/2005 | Cherkasova | H04L 29/06027 709/231 |
| 2007/0088703 A1 * | 4/2007 | Kasiolas | G06F 3/0605 |
| 2009/0059795 A1 * | 3/2009 | Fonseca, Jr. | H04W 84/18 370/236 |

(Continued)

OTHER PUBLICATIONS

Mangal, G. et at.; "Flexible Cloud Computing by Integrating Public-private Clouds Using Openstack"; Nov. 25-27, 2015; 2 pages.

*Primary Examiner* — Oanh Duong
(74) *Attorney, Agent, or Firm* — Hewlett Packard Enterprise Patent Department (57) ABSTRACT

In an example, it is determined if a first cluster of computing nodes can host an additional service. If the first cluster of computing nodes can host the additional service, a first service hosted in a second cluster of computing nodes is identified as the additional service. Subsequently, an internet protocol (IP) address for the first service is reallocated from the second cluster of computing nodes to the first cluster of computing nodes.

19 Claims, 6 Drawing Sheets

(56) References Cited

U.S. PATENT DOCUMENTS

| | | | |
|---|---|---|---|
| 2011/0183681 A1* | 7/2011 | Park | H04W 60/04 455/456.1 |
| 2013/0054806 A1* | 2/2013 | Francis | H04L 67/1002 709/226 |
| 2014/0047079 A1* | 2/2014 | Breternitz | G06F 9/5072 709/220 |
| 2014/0047095 A1* | 2/2014 | Breternitz | G06F 9/5072 709/224 |
| 2014/0047227 A1* | 2/2014 | Breternitz | G06F 9/5066 713/2 |
| 2014/0047272 A1* | 2/2014 | Breternitz | G06F 11/3495 714/32 |
| 2014/0047341 A1* | 2/2014 | Breternitz | G06F 9/505 715/735 |
| 2014/0047342 A1* | 2/2014 | Breternitz | G06F 9/5061 715/735 |
| 2014/0149590 A1* | 5/2014 | Mallipeddi | G06F 9/5088 709/226 |
| 2014/0195687 A1* | 7/2014 | Rewaskar | H04L 67/34 709/226 |
| 2014/0298047 A1* | 10/2014 | Holler | G06F 1/329 713/300 |
| 2015/0261630 A1* | 9/2015 | Endo | G06F 11/2028 714/4.11 |
| 2017/0339070 A1 | 11/2017 | Chang et al. | |
| 2018/0198855 A1* | 7/2018 | Wang | G06F 9/4881 |
| 2018/0260261 A1* | 9/2018 | Mohammed | G06F 9/5077 |
| 2018/0260262 A1* | 9/2018 | Mohammed | G06F 11/008 |
| 2018/0262563 A1* | 9/2018 | Mohammed | H04L 69/40 |
| 2018/0276050 A1* | 9/2018 | Gong | G06F 9/5083 |
| 2019/0197132 A1* | 6/2019 | Sharma | G06F 16/29 |
| 2019/0379590 A1* | 12/2019 | Rimar | H04L 43/062 |

\* cited by examiner

MOVEMENT OF SERVICES ACROSS CLUSTERS

BACKGROUND

A service deployed in a cluster of computing nodes may be used to perform one or more specialized operations, such as processing text in feeds on social media, processing images, and providing web pages. Sometimes, several clusters of computing nodes, each hosting services, may be managed together in a centralized fashion.

BRIEF DESCRIPTION OF DRAWINGS

The following detailed description references the figures, wherein.

DETAILED DESCRIPTION

Services may be deployed in a cluster of computing nodes, interchangeably referred to as a cluster. Sometimes, multiple clusters, each hosting services, may be managed as if they were one. This is referred to as cluster federation. Different clusters of a federation of clusters may be part of different cloud service platforms, interchangeably referred to as clouds. For instance, a first cluster in a private cloud, and a second cluster in a public cloud may be managed together.

In some cases, a first cloud having the first cluster may have lesser amount of computational resources as compared to the second cloud having the second cluster. This may be the case, for example, when the first cloud is a private cloud and the second cloud is a public cloud. In some situations, of all the services to be deployed, a maximum possible number of the services may have to be hosted in the first cluster, and the remaining services may have to be hosted in the second cluster. This may be due to, for example, lesser cost, better reliability, greater security, and lesser latency of the first cloud as compared to the second cloud.

After deployment of the services to the first and second clusters, sometimes, the first cluster may become capable of hosting additional services, for example, due to deletion of a service from the first cluster or decrease in resource utilization by a service hosted in the first cluster. However, generally, once deployed to their respective clusters, services may not be redistributed to another cluster.

The present subject matter relates to movement of services across clusters. With the implementations of the present subject matter, services may be redistributed across clusters even after their deployment.

In accordance with an example implementation, it is determined whether a first cluster of computing nodes, interchangeably referred to as a first cluster, can host an additional service hosted in a cluster different from the first cluster. The determination may be performed, for example, based on a resource utilization of the first cluster. If it is determined that the first cluster can host the additional service, a first service hosted in a second cluster may be identified as the additional service. The first service may include a first pod to handle a subset of service requests received by the first service. Further, an Internet Protocol (IP) address corresponding to the first service may be allocated to the second cluster of computing nodes.

Subsequent to the identification of the first service as the additional service, the IP address is reallocated from the second cluster to the first cluster, so that service requests related to the first service can be directed to the first cluster. Additionally, a selector for the first pod may be changed from the second cluster to the first cluster. The selector for the first pod is indicative of a cluster in which the first pod is to be hosted. The change of the selector facilitates the movement of the first pod from the second cluster to the first cluster.

The present subject matter enables dynamic redistribution of services across clusters. Since a service is automatically moved from the second cluster to the first cluster when the first cluster becomes capable of hosting an additional service, the first cluster can be utilized to its fullest extent. Therefore, a cluster that is superior compared to other clusters in terms of various factors, such as security, quality of service, cost-effectiveness, and latency, can be utilized to host the maximum possible number of services at all times.

The following description refers to the accompanying drawings. Wherever possible, the same reference numbers are used in the drawings and the following description to refer to the same or similar parts. While several examples are described in the description, modifications, adaptations, and other implementations are possible and are intended to be covered herein.

Figure 1:
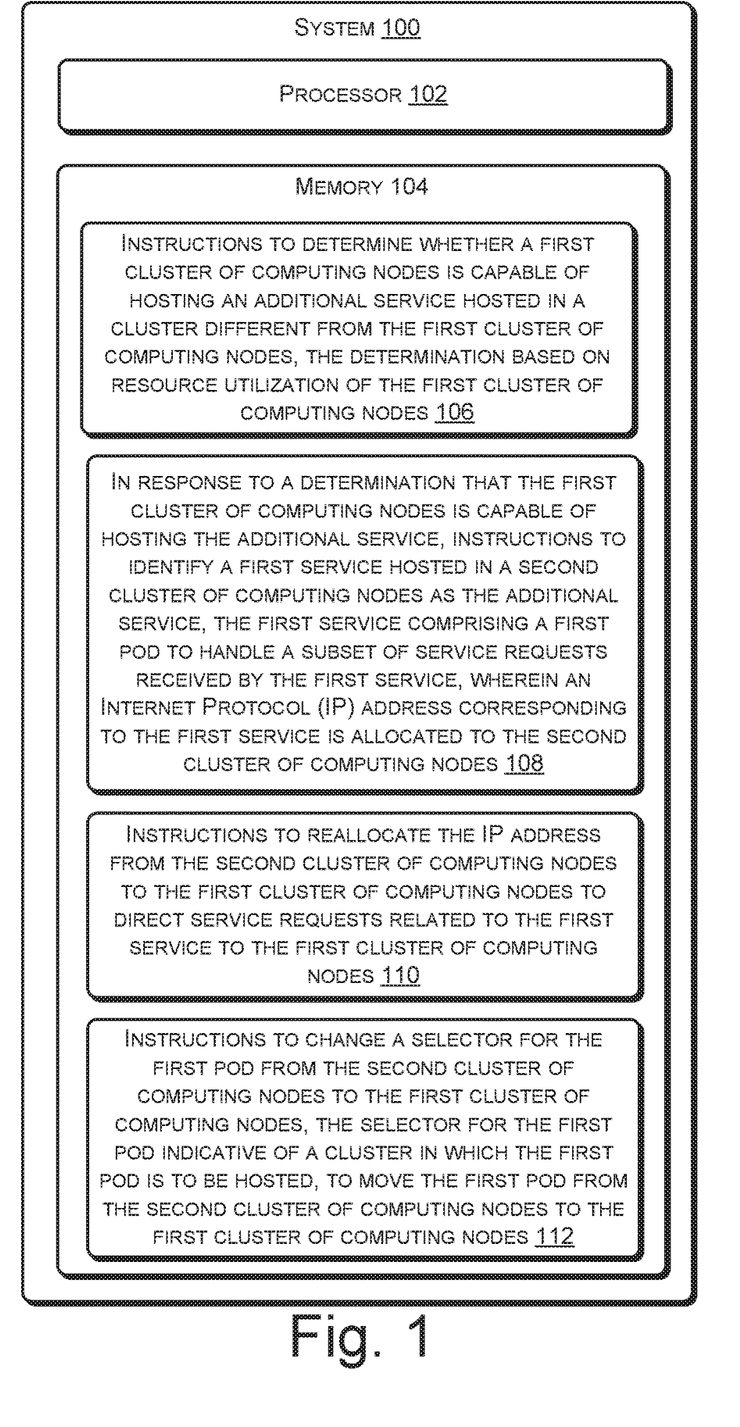
FIG. 1 illustrates a system to facilitate movement of services across clusters, according to an example implementation of the present subject matter.

FIG. 1 illustrates a system 100 to facilitate movement of services across clusters, according to an example implementation of the present subject matter. The system 100 may be implemented as any of a variety of computing systems, such as a desktop computer, a laptop computer, a server, and the like. In an example, the system 100 may be implemented as a cluster of computing systems. The system 100 includes a processor 102 and a memory 104 coupled to the processor 102.

The processor 102 may be implemented as microprocessors, microcomputers, microcontrollers, digital signal processors, central processing units, state machines, logic circuitries, and/or any devices that manipulate signals based on operational instructions. Among other capabilities, the processor 102 can fetch and execute computer-readable instructions stored in the memory 104. The computer-readable instructions, hereinafter referred to as instructions, include instructions 106, instructions 108, instructions 110, and instructions 112. The functions of the processor 102 may be provided through the use of dedicated hardware as well as hardware capable of executing machine readable instructions.

The memory 104 may include any non-transitory computer-readable medium including volatile memory (e.g., RAM), and/or non-volatile memory (e.g., EPROM, flash memory, Memristor, etc.). The memory 104 may also be an external memory unit, such as a flash drive, a compact disk drive, an external hard disk drive, or the like.

In addition to the processor 102 and the memory 104, the system 100 may also include interface(s) and system data (not shown in FIG. 1). The interface(s) may include a variety of machine readable instructions-based interfaces and hardware interfaces that allow interaction with a user and with other communication and computing devices, such as network entities, web servers, and external repositories, and peripheral devices. The system data may serve as a repository for storing data that may be fetched, processed, received, or created by the instructions.

In operation, when executed by the processor 102, the instructions 106 enable determining whether a first cluster of computing nodes (not shown in FIG. 1), hereinafter referred to as a first cluster, can host an additional service hosted in a cluster different from the first cluster. In an example, the determination may be based on a resource utilization of the first cluster. For example, if the resource utilization of the first cluster is lesser than a threshold value, it may be determined that the first cluster can host an additional service.

In response to the determination that the first cluster can host the additional service, the instructions 108 cause identification of a first service hosted in a second cluster of computing nodes, hereinafter referred to as the second cluster, as the additional service. The first service may include a first pod (not shown in FIG. 1) to handle a subset of service requests received by the first service. Further, an Internet Protocol (IP) address corresponding to the first service is allocated to the second cluster.

Upon identification of the first service as the additional service, the instructions 110 cause reallocation of the IP address from the second cluster to the first cluster. This allows directing service requests related to the first service to the first cluster. Further, the instructions 112 cause change of a selector for the first pod from the second cluster to the first cluster. The selector for the first pod indicates a cluster in which the first pod is to be hosted. Accordingly, the change of the selector for the first pod from the second cluster to the first cluster causes movement of the first pod from the second cluster to the first cluster.

The movement of the services and other aspects of the present subject matter will be explained in greater detail with reference to the subsequent figures.

Figure 2:
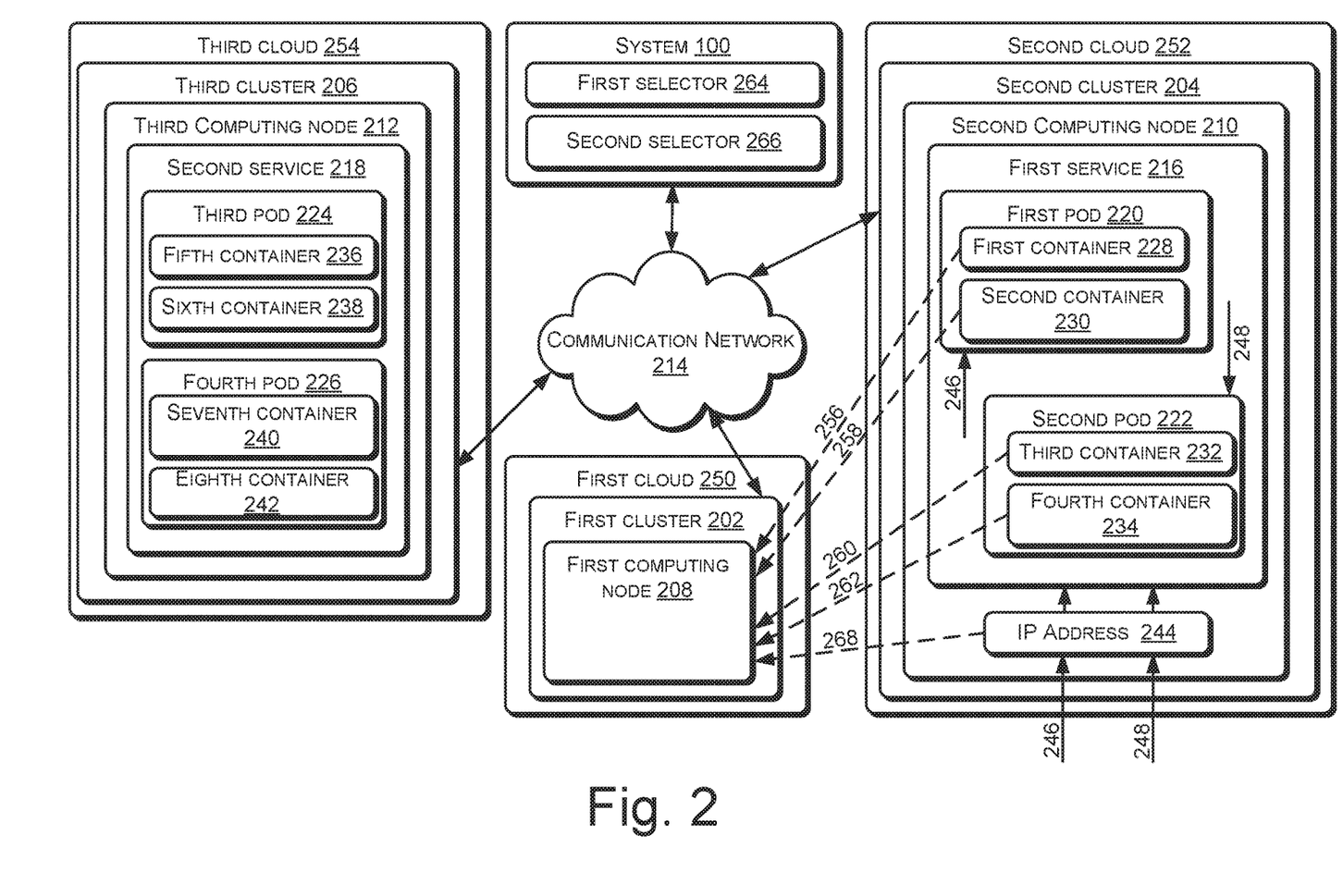
FIG. 2 illustrates a system interacting with a plurality of clusters of computing nodes, according to an example implementation of the present subject matter.

FIG. 2 illustrates the system 100 interacting with a plurality of clusters of computing nodes, according to an example implementation of the present subject matter. The plurality of clusters of computing nodes, interchangeably referred to as the plurality of clusters, includes the first cluster 202, the second cluster 204, and a third cluster of computing nodes 206, hereinafter referred to as the third cluster 206. The first cluster 202, second cluster 204, and third cluster 206 may be collectively referred to as clusters 202-206. Each cluster may include a computing node. For example, the first cluster 202 may include a first computing node 208, the second cluster 204 may include a second computing node 210, and the third cluster 206 may include a third computing node 212. The computing nodes may be physical computing nodes, such as a server, laptop, or desktop, or a virtual computing node, such as a virtual machine (VM), hosted in another physical computing node. Although not illustrated, each cluster may include more than one computing node as well.

In an example, the system 100 may be implemented as a cluster of computing nodes that interacts with the clusters 202-206. Further, the system 100 may be utilizing a container orchestrator, which is used for automating deployment, scaling, and management of containerized applications. The container orchestrator may be, for example, Kubernetes™.

The system 100 may be connected to the clusters 202-206 through a communication network 214. The communication network 214 may be a wireless network or a wired network, or a combination thereof. The communication network 214 may be a collection of individual networks, interconnected with each other and functioning as a single large network (e.g., the internet or an intranet). Examples of such individual networks include Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the communication network 214 includes various network entities, such as transceivers, gateways, and routers.

On the computing nodes of the clusters 202-206, services may be deployed. For instance, on the second computing node 210, a first service 216 may be deployed, and on the third computing node 212, a second service 218 may be deployed. The terms "deployment of service on a computing node" and "hosting of service by a computing node" may be used interchangeably. Although not illustrated, a service may be deployed on the first computing node 208 as well. Further, each computing node may host more than one service as well.

Each service may be used to perform one or more specialized operations. Examples of operations performed by services may include processing text on feeds on a social media platform, processing images on a social media platform, and providing web pages, such as e-commerce web pages. The requests to perform the operations may be received in the form of service requests, for example, from a client (not shown in FIG. 2). Accordingly, the performance of operations may be interchangeably referred to as handling of service requests. To handle the service requests, each service may include several containers. A container is an environment that can isolate processes running within itself from a computing node the container is hosted in and from other processes running on the computing node. The container may provide, among other things, code, runtime, system tools, system libraries, and settings to the processes. Further, the container can provide a consistent runtime environment to the processes regardless of the computing node it is hosted in. In an example, one or more containers may be wrapped into a structure known as pod. All containers within a pod may share a set of resources, such as storage, memory, and network. In an example, when the service is used for providing web pages to requesting clients, each pod of the service may run a web server.

Each service may include a plurality of pods, each of which may include containers. For example, the first service 216 may include a first pod 220 and a second pod 222 and the second service 218 may include a third pod 224 and a fourth pod 226. Further, the first pod 220 may include a first container 228 and a second container 230, the second pod 222 may include a third container 232 and a fourth container 234, the third pod 224 may include a fifth container 236 and a sixth container 238, and the fourth pod 226 may include a seventh container 240 and an eighth container 242.

In an example, a service may have a corresponding Internet Protocol (IP) address, using which service requests can be directed to the service. For instance, the first service 216 has a corresponding IP address denoted by the reference numeral 244, hereinafter referred to as the IP address 244. Through the IP address 244, the first service 216 may receive service requests, such as a first service request 246 and a second service request 248.

When a service receives a service request, say, from a client, the service may allocate the service request to one of its pods. Such an allocation may be based on a workload of each pod. For example, upon receiving the first service request 246, the first service 216 may allocate the first service request 246 to the first pod 220, and upon receiving the second service request 248, the first service 216 may allocate it to the second pod 222. Accordingly, the first service 216 and the other services, balancing and managing workload of their respective pods, may be referred to as load balancer services.

In an example, the first cluster 202, second cluster 204, and third cluster 206 may be managed together. The management of several clusters together is commonly referred to as cluster federation and refers to creation and control of the clusters 202-206 in a centralized fashion. In an example, the clusters may be managed in the centralized fashion by a federation control plane (not shown in FIG. 2). The clusters so federated may be referred to as the clusters of a federation and may be collectively referred to as a federation of clusters or a federation. The federation control plane may be deployed, for example, in the system 100.

In an example, each cluster may be part of a different cloud service platform, hereinafter referred to as a cloud. For instance, the first cluster 202 may be part of a first cloud 250, second cluster 204 may be part of a second cloud 252, and third cluster 206 may be part of a third cloud 254. A cloud may be referred to as a set of computing concepts involving computing devices, such as servers, that may be connected through a communication network, such as the Internet. The first cloud 250 may be a private cloud, which may be accessed by a specific set of users, such as users belonging to a particular organization, users in a particular region, or the like, while being inaccessible to others. Examples of a private cloud may include an on-premises cloud, which may include a data center or computing resources deployed on the premises of a particular organization, or a regional cloud, which includes data center or computing resources deployed in a particular region. In contrast, the second cloud 252 and third cloud 254 may be publicly accessible, i.e., accessible without any restriction of organizations or regions. Accordingly, the second cloud 252 and third cloud 254 may be referred to as public clouds.

In some cases, the first cloud 250 may have certain superior characteristics as compared to the other clouds. For example, if the first cloud 250 is a private cloud, it may provide better security for the data stored in it. This may be because the data does not move to a publicly accessible cloud, and therefore, the chances of the data being accessed by an unauthorized person is significantly lesser. Further, if the first cloud 250 is a private cloud, the clients that access the first cloud 250 may be in proximity to the first cloud 250. For instance, the clients may be in the same premises as the first cloud 250. In such a case, the data in the first cloud 250 may be accessed with a small latency, as compared to a public cloud that may be far away from the clients. Still further, as will be known, a cost may be incurred in deploying services in a cloud. Such a cost is referred to as hosting cost. Generally, the hosting cost of a public cloud is higher compared to that of a private cloud. Accordingly, if the first cloud 250 is a private cloud, the cost incurred for deploying the services in the first cloud 250 may be considerably lesser.

In view of the superior characteristics of the first cloud 250 over the second cloud 252 and the third cloud 254, in an example, the first cluster 202, hosted in the first cloud 250, is utilized to the maximum extent possible. To facilitate maximum utilization of the first cluster 202, it may be determined if the first cluster 202 can host an additional service deployed in another cluster, such as the second cluster 204 or the third cluster 206. Such a determination may be performed based on a resource utilization of the first cluster 202, as will be explained with reference to FIG. 3.

If it is determined that first cluster 202 can host the additional service, the additional service may be selected from several services that are deployed on clusters different from the first cluster 202. Such services that are deployed on clusters different from the first cluster 202 are referred to as a plurality of external services or external services. The external services may include the first service 216 and the second service 218. The selection of the additional service from the external services may be based on the resource consumption of each external service, as will be explained with reference to FIG. 3.

Upon its selection, the additional service may then be moved to the first cluster 202. For example, if the first service 216 is selected as the additional service, the first service 216 is moved from the second cluster 204, where it is currently hosted, to the first cluster 202. As mentioned earlier, the first service 216 includes a plurality of pods, such as the first pod 220 and the second pod 222, and each pod includes a plurality of containers, such as the first container 228 and the second container 230 in the first pod 220, and the third container 232 and the fourth container 234 in the second pod 222. Accordingly, to move the first service 216, the first container 228, second container 230, third container 232, and fourth container 234 may be moved from the second cluster 204 to the first cluster 202, as represented by arrows 256, 258, 260, and 262, respectively. In an example, upon movement of the containers 228-234 to the first cluster 202, the containers 228-234 may be destroyed from the second cluster 204. Further, a respective new instance of each of the containers 228-234 may be created in the first cluster 202.

To facilitate movement of the selected additional service, in an example, a selector for each pod of the additional service is changed from its originally deployed cluster to the first cluster 202. A selector for a pod is a parameter that can be used to specify a cluster in which the pod is to be hosted. Therefore, upon changing the selector for the pod from one cluster to another cluster, the system 100 may move the pod across the clusters. For example, if the selected additional service is the first cluster 202, a selector for the first pod 220 and a selector for the second pod 222 may be updated from the second cluster 204 to the first cluster 202. The selectors for the first pod 220 and second pod 222 are a first selector 264 and second selector 266, respectively. In an example, the selector for a pod is a cluster selector, which indicates a label of the cluster in which the pod is to be hosted.

In addition to indicating the cluster that is to host a pod, in an example, the selector may also indicate a computing node of the cluster that is to host the pod. For example, when the first service 216 is hosted in the second computing node 210, the first selector 264 may indicate that the first pod 220 is hosted in the second computing node 210. Since the second computing node 210 is part of the second cluster 204, by indicating that the first pod 220 is hosted in the second computing node 210, the first selector 264 also indicates that the first pod 220 is hosted in the second cluster 204 (as the second computing node 210 is part of the second cluster 204). Accordingly, when the first service 216 is to be moved to the first computing node 208, the first selector 264 may be changed from the second computing node 210 to the first computing node 208. The selector as referred to in this example is a node selector, as it indicates a label of the computing node in which the pod is to be hosted. Overall, it is to be understood that a selector may be any parameter that indicates, directly or indirectly, the cluster that is to host a pod and that may be changed to move the pod across clusters. Further, the change of the selector from the second cluster 204 to the first cluster 202 includes change of the selector from a computing node in the second cluster 204 to a computing node in the first cluster 202.

In an example, the selector for each pod in each cluster in the federation may be stored in the system 100. Accordingly, the instructions 112 may access a location in the system 100 in which a selector for a pod to be moved is stored and then change the selector. In response to the change of the selector, an additional set of instructions (not shown in FIG. 2) stored in the memory 104 may cause movement of the pod across the cluster. In an example, the additional set of instructions may be stored in a second system (not shown in FIG. 2) that is external to the system 100. Accordingly, upon change of the selector by the instructions 112, the system 100 may communicate the change to the second system, which may then move the pods based on the change of the selector.

In an example, a selector may be common for all pods of a service. In such a case, changing selector for the service may connote changing selector for each pod of the service.

As mentioned earlier, each service has a corresponding IP address, using which services requests directed to the service are received by the service. Such an IP address is allocated to the cluster on which the service is deployed. For instance, the first service 216 has the IP address 244, which is allocated to the second cluster 204, in which the first service 216 is deployed. When the service is to be moved to the first cluster 202, the IP address corresponding to the service is reallocated to the first cluster 202. For example, if the first service 216 is selected as the additional service for movement to the first cluster 202, the IP address 244 is reallocated to the first cluster 202, as indicated by arrow 268. The reallocation of the IP address 244 ensures that the first service 216 continues to receive the service requests directed to it even after its movement to the first cluster 202.

As indicated by the arrows 256-262, upon selection of the first service 216 as the additional service, the containers 228-234 are moved to the first computing node 208, which is part of the first cluster 202. Further, as indicated by the arrow 268, the IP address 244 is also allocated to the first computing node 208. The first computing node 208 may be one of several computing nodes of the first cluster 202. In such a case, the first computing node 208 may be selected to host the first service 216 from among the several computing nodes. The selection of the first computing node 208 and the selection of the first service 216 as the additional service will be explained with reference to FIG. 3.

Figure 3:
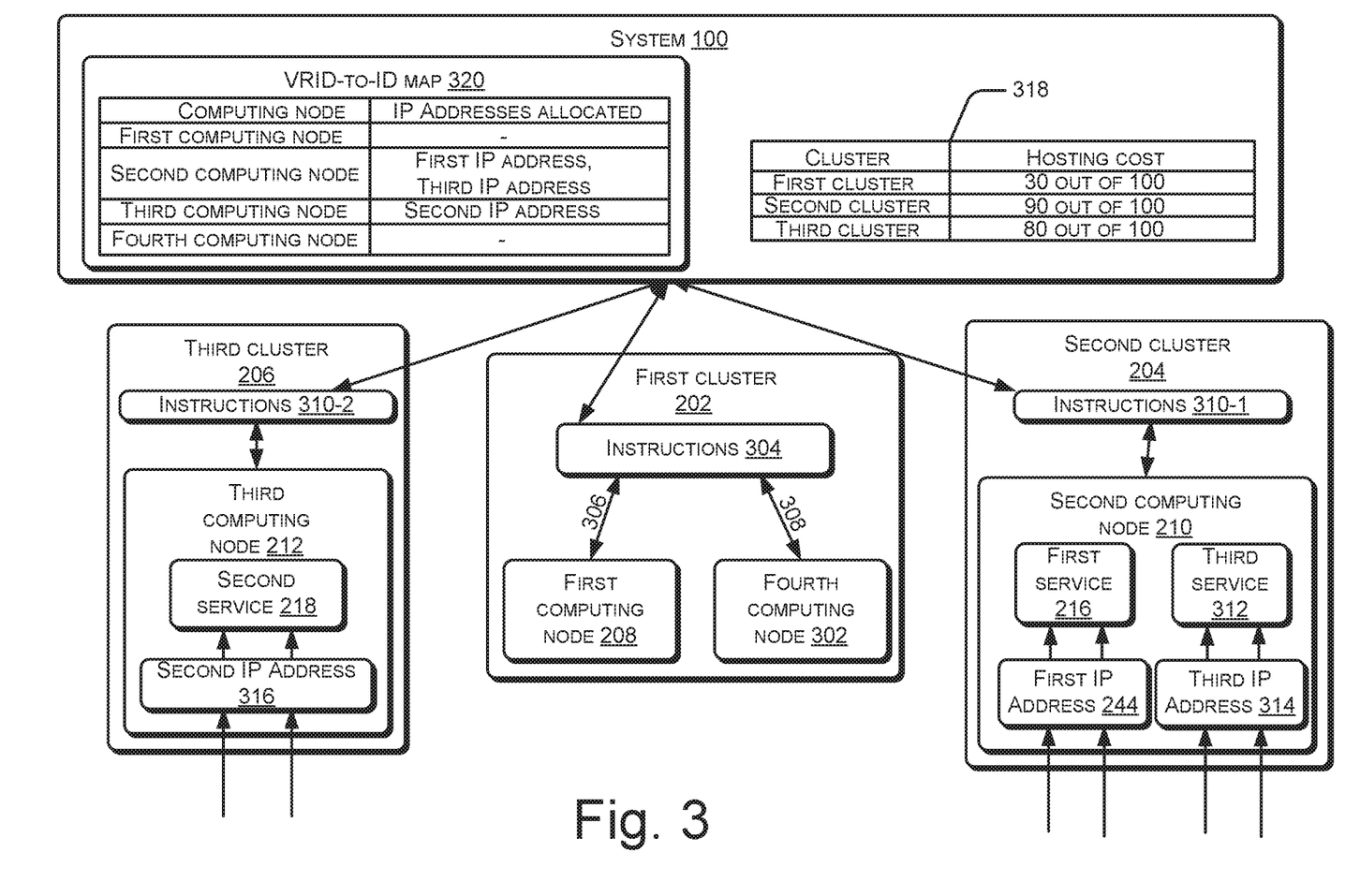
FIG. 3 illustrates the interaction of a system with a first cluster of computing nodes, second cluster of computing nodes, and third cluster of computing nodes, according to an example implementation of the present subject matter.

FIG. 3 illustrates the interaction of the system 100 with the first cluster 202, second cluster 204, and third cluster 206, according to an example implementation of the present subject matter. As illustrated, the first cluster 202 may include a plurality of computing nodes, such as the first computing node 208 and a fourth computing node 302. Although not illustrated, each computing node of the first cluster 202 may host services. The hosting of the services may cause utilization of resources of the computing nodes. The resources utilized may include, for example, processor and memory of the computing nodes. Accordingly, the resource utilization may include processor utilization and memory utilization.

In an example, the first cluster 202 may include instructions 304 that enable monitoring of the resource utilization of the first cluster 202. For this, the instructions 304 may cause receiving of information of the resource utilization of each computing node from the respective computing node, as indicated by arrows 306 and 308. The instructions 304 may be deployed in any computing node of the first cluster 202.

Based on the resource utilization of the first cluster 202, it is determined whether the first cluster 202 can host an additional service. The first cluster 202 may be determined as being capable of hosting the additional service if, for example, the resource utilization of the first cluster 202 decreases lesser than a first threshold. The resource utilization of the first cluster 202 may decrease lesser than the first threshold if the resource utilization of a computing node is lesser than a second threshold. The resource utilization of the computing node may become lesser than the second threshold if a service hosted in the computing node is deleted or if resources consumed by a service hosted in the computing node reduces.

In an example, the determination of whether the first cluster 202 can host the additional service is performed by the instructions 304. In such a case, the instructions 304 may be part of the instructions 106. Further, in such a case, the first cluster 202 may be said to be part of the system 100. Alternatively, the instructions 304 may cause transmission of information of the resource utilization of each cluster to the system 100. Based on the information, the instructions 106 may cause determination of whether the first cluster 202 can host the additional service.

Upon the determination that the first cluster 202 can host an additional service, from among all the computing nodes in the first cluster 202, such as the first computing node 208 and the fourth computing node 302, a computing node is selected for hosting the additional service. The selection of the computing node may be based on the resource utilization of each computing node in the first cluster 202. For example, the computing node for which the resource utilization is lesser than the second threshold may be selected as the computing node to host the additional service. If the resource utilization of more than one computing node in the first cluster 202 is lesser than the second threshold, the computing node that has the least resource utilization may be selected as suitable for hosting the additional service. The selection of the computing node may be performed by the instructions 304 or the instructions 106. The selection of the computing node may also be referred to as identification of a computing node for hosting the additional service. In an example, the selected computing node may be the first computing node 208. The below description is explained with reference to a situation in which the selected computing node is the first computing node 208. However, it will be understood that such an explanation will also apply to a scenario in which the fourth computing node 302 is selected.

In addition to selecting the computing node, the additional service, which is to be hosted in the first cluster 202, is also selected from several external services, each hosted in a cluster different from the first cluster 202. To facilitate the selection, resource consumption of each external service may be monitored. The resource consumption of the external service may include the amount of processor resources consumed by the external service and the amount of memory resources consumed by the external service, hereinafter referred to as processor consumption of the external service and memory consumption of the external service, respectively. In an example, the selection of the additional service is performed based on a resource consumption of each external service of the plurality of external services and the resource utilization of the first computing node 208, as will be explained below.

The monitoring of the resource consumption may be facilitated by instructions 310, which are present in each cluster other than the first cluster 202. The instructions 310 in the second cluster 204 may be referred to as instructions 310-1 and the instructions 310 in the third cluster 206 may be referred to as instructions 310-2. Since the monitoring of the resource consumption is facilitated by the instructions 310-1 and 310-2, in an example, the second cluster 204 and the third cluster 206 may be considered to be part of the system 100. In an example, the resource consumption of an external service is determined based on a number of service requests received for an IP address corresponding to the external service and an average resource consumption per service request. Such a determination, in accordance with an example, is explained below:

Consider that the second computing node 210 hosts the first service 216 and a third service 312. The first service 216 has the corresponding IP address 244 and the third service 312 may have a corresponding IP address 314. The IP address 244 may be referred to as first IP address 244 and the IP address 314 may be referred to as the third IP address 314. Consider that the number of service requests received at the first IP address 244 until time t1 is R11 and that the number of service requests received at the IP address 244 until time t2 (>t1) is R12. In an example, t2−t1 is 1 second.

Accordingly, the average number of service requests received at the first IP address 244 per unit time, such as per second, may be represented as below:

$$R1=(R12-R11)/(t2-t1) \quad (1)$$

where R1 is the average number of service requests received at the first IP address 244 per unit time.

Consider also that the number of service requests received at the third IP address 314 until time t1 is R31 and that the number of service requests received at the third IP address 314 until time t2 is R32. Accordingly, the average number of service requests received at the third IP address 314 per unit time may be represented as below:

$$R3=(R32-R31)/(t2-t1) \quad (1)$$

where R3 is the average number of service requests received at the third IP address 314 per unit time.

Now, consider that processor utilization of the second computing node 210, in which the first service 216 and the third service 312 are hosted, at time t1 is P1 and the processor utilization at time t2 is P2. Due to the continuous arrival of several service requests to the first service 216, and due to the consequent handling of the service requests, the processor utilization may increase over time. Therefore, P2 may be greater than P1. Accordingly, an increase in the processor utilization per unit time may be represented as below:

$$P=(P2-P1)/(t2-t1) \quad (2)$$

where P is the average increase in the processor utilization per unit time.

Since the increase in processor utilization of the second computing node 210 is due to handling of the R1 service requests (corresponding to the first service 216) and handling of the R3 service requests (corresponding to the third service 312), the average processor consumption per service request per unit time may be represented as below:

$$P_{PR}=P/(R1+R3) \quad (3)$$

where $P_{PR}$ is the average processor consumption per service request. Therefore, the processor consumption for the first service 216 per unit time and the processor consumption for the third service 312 per unit time may be represented as below:

$$P11=P_{PR}*R1 \quad (4), \text{and}$$

$$P31=P_{PR}*R3 \quad (5)$$

where P11 is the processor consumption for the first service 216 per unit time and P31 is the processor consumption for the third service 312 per unit time. The processor consumption for a service per unit time may be referred to as the processor consumption of the service. Similarly, the memory consumption for a service per unit time may be referred to as the memory consumption of the service.

Similar to the computation of the processor consumption of the first service 216 and the third service 312, memory consumption each of the first service 216 and the third service 312 may also be computed. For this, the memory utilization of the second computing node 210 at time t1 (M1) and the memory utilization at time t2 (M2) may be utilized. Using the computation, an average memory consumption per service request, hereinafter referred to as $M_{PR}$, a memory consumption of the first service 216, hereinafter referred to as M11, and a memory consumption of the third service 312, hereinafter referred to as M31, may be computed.

The above computation of the processor consumption and memory consumption may be performed for the second service 218 as well, which is hosted in the third computing node 212. The computation may be performed based on the number of service requests arriving at a second IP address 316 corresponding to the second service 218. The computed processor consumption and memory consumption of the second service 218 may be represented as P21 and M21, respectively.

In an example, the processor consumption and memory consumption of each service hosted in a computing node may be stored in a resource consumption table. An example resource consumption table for the second computing node 210, hosting the first service 216 and the third service 312, is provided below:

TABLE 1

Resource consumption table for the second computing node 210

| Service | IP address | Requests per unit time R | Processor consumption P | Memory consumption M |
|---|---|---|---|---|
| First service | First IP address | R1 | P11 | M11 |
| Third service | Third IP address | R3 | P31 | M31 |

The resource consumption table of a computing node may be populated when the instructions 310 in the cluster having the computing node are executed. For example, the instructions 310-1 may enable population of the resource consumption table for the second computing node 210 and any other computing node in the second cluster 204 in a manner as explained with reference to equations (1)-(5).

The processor consumption and the memory consumption of an external service can be used to determine whether the external service can be selected as the additional service or not. For this, a sum of the memory consumption of the external service and the memory utilization of the first computing node 208, which is selected for hosting the additional service, may be computed. This sum is compared against a memory utilization threshold. Similarly, a sum of the processor consumption of the external service and the processor utilization of the first computing node 208 may be computed. This sum is compared against a processor utilization threshold. When the computed sums are lesser than their respective thresholds, the external service may be selected as the additional service. The rationale for such a selection is explained below with reference to the first service 216, second service 218, and third service 312.

As mentioned earlier, the values P11 and M11 denotes the processor consumption and memory consumption, respectively, of the first service 216. Accordingly, upon adding the value P11 to the processor utilization of the first computing node 208, a cumulative processor utilization of the first computing node 208, if it hosts the first service 216, can be determined. For example, if the processor utilization of the first computing node 208 is $P_C$, the cumulative processor utilization, if the first computing node 208 hosts the first service 216 also, would be $P_C$+P11. Further, if the memory utilization of the first computing node 208 is $M_C$, the cumulative memory utilization of the first computing node 208, if it hosts the first service 216, would be $M_C$+M11. The cumulative processor utilization and cumulative memory utilization may be collectively referred to as cumulative resource utilization. Further, the cumulative resource utilization of the first computing node 208 in a condition that the first computing node 208 is to host a particular service may be referred to as the cumulative processor utilization for the particular service.

If the first computing node 208 is to host the second service 218 instead of the first service 216, the cumulative processor utilization and cumulative memory utilization for the second service 218 would be $P_C$+P21 and $M_C$+M21, respectively. Similarly, if the first computing node 208 is to host the third service 312 instead of the first service 216 and the second service 218, the cumulative processor utilization and cumulative memory utilization for the third service 312 would be $P_C$+P31 and $M_C$+M31, respectively.

If the cumulative memory utilization for an external service exceeds the processor utilization threshold, or if the cumulative memory utilization for the external service exceeds the memory utilization threshold, the first computing node 208 is likely to be overloaded if it hosts the external service. Therefore, such an external service is not suitable for being hosted in the first computing node 208. Thus, the cumulative memory utilization and cumulative processor utilization may be computed for a plurality of external services until an external service is found for which both the cumulative memory utilization and cumulative processor utilization are lesser than their respective thresholds. Such an external service may then be selected as the additional service. In an example, the additional service is the first service 216.

In an example, the computation of the cumulative memory utilization and the cumulative processor utilization for external services in a cluster may be performed by the system 100 when it executes the instructions 108. For this, the resource consumption table for each computing node in each cluster of the federation may be received from the clusters. The resource consumption table for each computing node in a cluster may be sent periodically when the instructions 310 corresponding to the cluster are executed. The resource consumption tables may be aggregated in the form of a federation cluster table, which provides information of the resource consumption information of all services hosted in the federation. An example federation cluster table is provided below:

TABLE 2

Federation cluster table

| Cluster | Second Cluster |
|---|---|
| Hosting Cost | 90 out of 100 |
| Processor Utilization | P |
| Memory Utilization | M |

| | Service | IP Address | Requests per unit time | Processor consumption | Memory consumption |
|---|---|---|---|---|---|
| Second computing | First service | First IP address | R1 | P11 | M11 |

TABLE 2-continued

Federation cluster table

| node | Third service | Third IP address | R3 | P31 | M31 |
|------|---------------|------------------|-----|-----|-----|
| | Cluster Hosting Cost Processor Utilization Memory Utilization | | | Third Cluster 80 out of 100 P M | |

| | Service | IP Address | Requests per unit time | Processor consumption | Memory consumption |
|---|---|---|---|---|---|
| Third computing node | Second service | Second IP address | R2 | P21 | M21 |
| | Cluster Hosting Cost Processor Utilization Memory Utilization | | | First Cluster 30 out of 100 P M | |

| | Service | IP Address | Requests per unit time | Processor consumption | Memory consumption |
|---|---|---|---|---|---|
| First computing node | — | — | — | — | — |
| | Processor Utilization Memory Utilization | | | P M | |

| | Service | IP Address | Requests per unit time | Processor consumption | Memory consumption |
|---|---|---|---|---|---|
| Fourth computing node | — | — | — | — | — |

Based on the information in the federation cluster table, the system 100 can compute the cumulative resource utilization. In an example, the system 100 may rank order the different clusters in the federation cluster table, and may compute the cumulative resource utilization for services in different clusters in the rank order. For instance, when the second cluster 204 is ranked above the third cluster 206, the cumulative resource utilization is first computed for the first service 216 and for the third service 312, before being computed for the second service 218.

The rank order, as mentioned above, may be based on various parameters of the clusters. In an example, the rank order is based on hosting costs of the clusters. A hosting cost of a cluster may be defined as a cost incurred in hosting a service in the cluster. In case of a cluster hosted in the public cloud, which may be the second cloud 252 or the third cloud 254, the hosting cost may be a cost charged by the provider of the cloud. In case of a cluster hosted in the private cloud which is managed by the organization utilizing the service, such as an on-premises cloud, the hosting cost may be the cost incurred due to power consumption of a computing devices of the private cloud, network bandwidth consumption, and the like.

The hosting cost may be indicated in the federation cluster table, and may be specified in a scale of 0 to 100, with 0 indicating no hosting cost and 100 indicating a maximum possible hosting cost. In an example, the hosting cost of the first cluster 202 may be the least among the first cluster 202, the second cluster 204, and the third cluster 206. This may be because the first cluster 202 is part of a private cloud.

Further, among the first cluster 202, the second cluster 204, and the third cluster 206, the second cluster 204 may have the highest hosting cost.

In an example, the cluster from which the additional service is to be identified may be selected based on the hosting costs of the clusters. For this, the system 100 may access the federation cluster table, and identify the cluster having the maximum hosting cost. Subsequently, system 100 may compute the cumulative resource utilization for each service in the selected cluster using the instructions 108, in the manner as explained above. For instance, referring to the federation cluster table, the second cluster 204 is identified as the cluster having the highest hosting cost. Subsequently, the instructions 108 can cause the identification of the additional service based on the resource consumption of each service hosted in the second cluster 204.

If none of the external services hosted in the second cluster 204 is identified as the additional service, the system 100 may compute the cumulative resource utilization for the services hosted in the third cluster 206, which is the cluster with the next highest hosting cost. If the additional service is not identified from the second cluster 204 also and if there are any more clusters, the system 100 may compute the cumulative resource utilization for the services hosted in those clusters in the order of their respective hosting costs. If no external service is identified as the additional service upon completion of the above computation for all clusters, the system 100 determines that movement of services is not possible at this point of time. Further, a notification to this effect may be provided to a user, such as an administrator of the federation of the clusters.

If, on the other hand, during the computation, an external service is identified as the additional service, the additional service may then be moved to the first cluster 202. Further, the system 100 refrains from computing the cumulative resource utilization for the services hosted in the other clusters for which the computation is not performed. For example, during the computation for the services hosted in the second cluster 204, if an external service hosted in the second cluster 204, such as the first service 216, is identified as the additional service, the system 100 does not perform the computation for the services in the third cluster 206.

The computation for identifying the additional service in the order of hosting cost of the clusters provides the maximum possible cost saving, as the movement of the service from a cluster having a higher hosting cost provides more cost saving than movement of the service from a cluster having a lower hosting cost.

Although the rank order for determining the cluster from which the additional service is to be identified is explained as being based on hosting cost, in some other examples, the rank order may be based on other parameters of the clusters, such as latency, reliability, and security. For example, the cluster that has the least reliability, such as having as having a high downtime, may be ranked highest. Accordingly, at an opportune instance, the service in that cluster is moved to the first cluster 202. In this manner, the performance of the services can be improved.

Although the computation of the resource utilization and resource consumption is explained with reference to memory resources and processor resources, in some examples, other resources, such as network, may also be considered. Further, in some examples, any one of the resources, such as the processor alone or the memory alone, may be considered for the computation.

As explained earlier, upon identifying the additional service, the service is moved to the first computing node 208 and the IP address corresponding to the service is reallocated to the first computing node 208. To move the first service 216 from the second computing node 210 to the first computing node 208, as mentioned earlier, the selector for each pod of the first service 216 may be changed from the second computing node 210 to the first computing node 208.

Further, to facilitate the reallocation of the first IP address 244 corresponding to the first service 216, the system 100 may utilize a Virtual Router Identifier (VRID)-to-IP map 320, which indicates the IP addresses allocated to each computing node in the federation. As illustrated, the VRID-to-IP map 320 indicates the first IP address 244, corresponding to the first service 216, as being allocated to the second computing node 210, as, prior to the reallocation of the first IP address 244, the first service 216 was deployed in the second computing node 210 and the first IP address 244, corresponding to the first service 216, is allocated to the second computing node 210. Therefore, in response to determination of the first service 216 as the additional service, the system 100 may update the VRID-to-IP map 320, such that the first IP address 244 is mapped to the first computing node 208. In response to the update, the system 100 reallocates the first IP address 244 to the first computing node 208.

Figure 4:
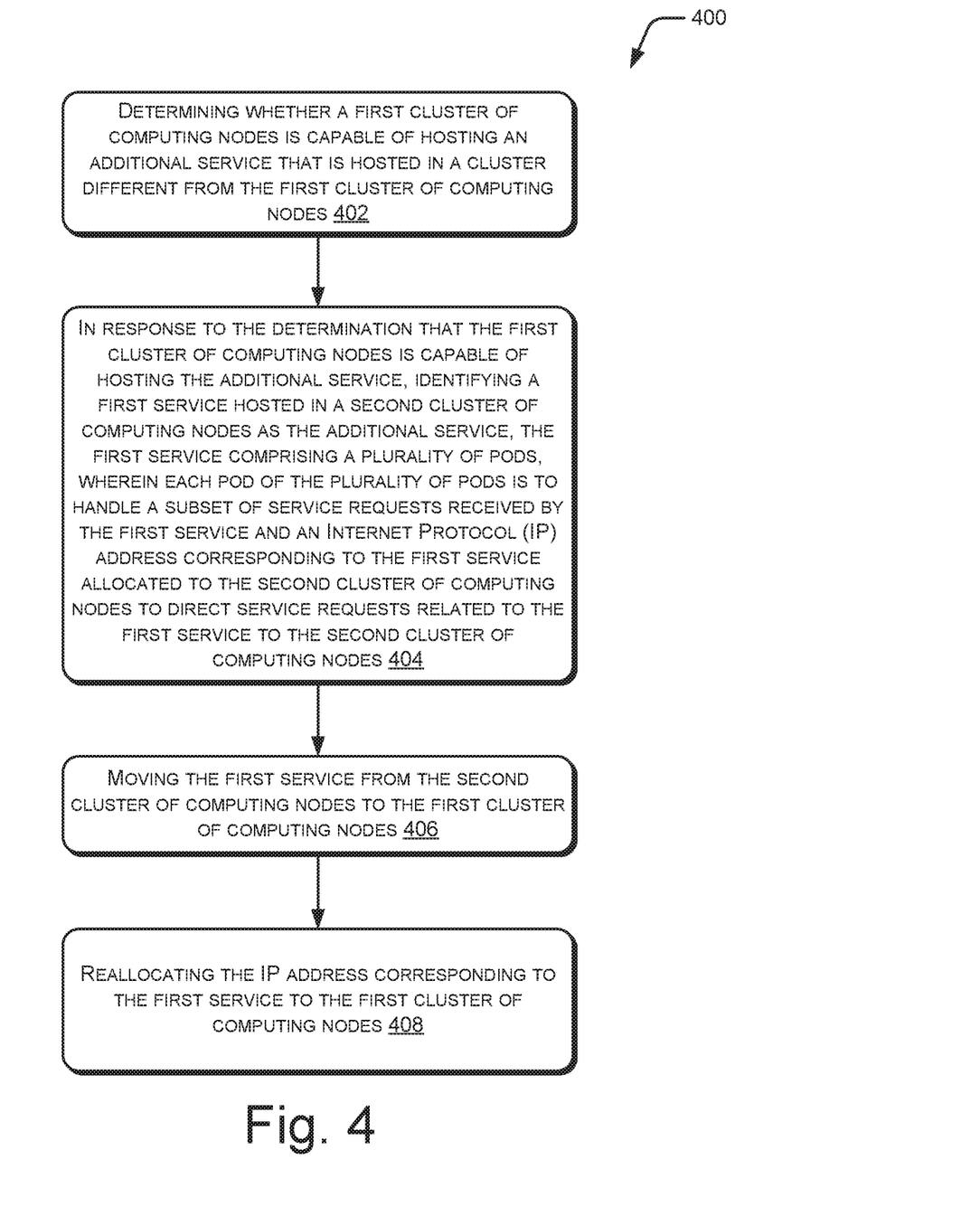
FIG. 4 illustrates a method for facilitating movement of services across clusters, according to example implementations of the present subject matter.
Figure 5:
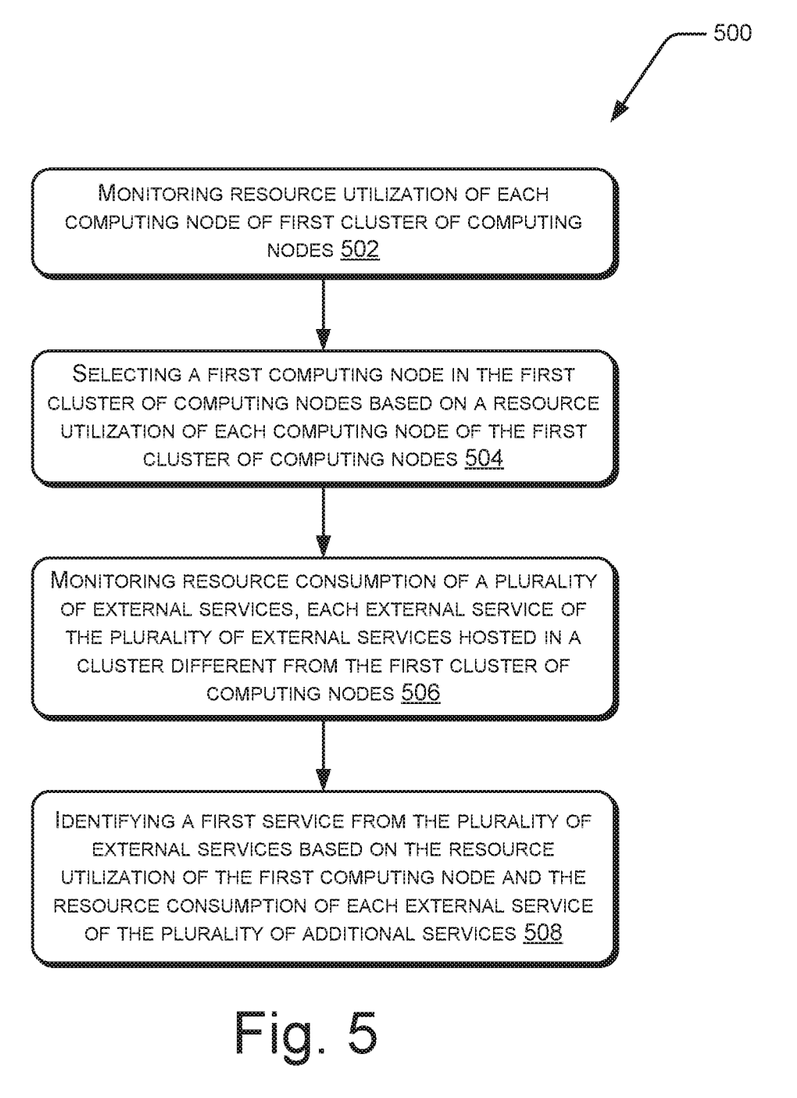
FIG. 5 illustrates a method for selecting a computing node to host an additional service and selection of the additional service from a plurality of external services, according to an example implementation of the present subject matter.

FIGS. 4 and 5 illustrate methods 400 and 500, respectively, for movement of services across clusters of computing nodes, according to example implementations of the present subject matter.

The order in which the methods 400 and 500 are described is not intended to be construed as a limitation, and any number of the described method blocks may be combined in any order to implement the methods 400 and 500, or an alternative method. Furthermore, the methods 400 and 500 may be implemented by processor(s) or computing device(s) through any suitable hardware, non-transitory machine-readable instructions, or a combination thereof.

It may be understood that steps of the methods 400 and 500 may be performed by programmed computing devices and may be executed based on instructions stored in a non-transitory computer readable medium. The non-transitory computer readable medium may include, for example, digital memories, magnetic storage media, such as one or more magnetic disks and magnetic tapes, hard drives, or optically readable digital data storage media. Further, although the methods 400 and 500 may be implemented in a variety of systems, the methods 400 and 500 are described in relation to the system 100, for ease of explanation. In an example, the steps of the methods 400 and 500 may be performed by a processing resource, such as the processor 102.

Referring to method 400, at block 402, it is determined whether a first cluster of computing nodes is capable of hosting an additional service that is hosted in a cluster different from the first cluster of computing nodes. The determination may include determining whether a resource utilization of the first cluster of computing nodes is lesser than a threshold. The first cluster of computing nodes may be interchangeably referred to as first cluster, and may be, for example, the first cluster 202.

In response to the determination that the first cluster is capable of hosting the additional service, at block 404, a first service hosted in a second cluster of computing nodes is identified as the additional service. The second cluster of computing nodes may be interchangeably referred to as second cluster, and may be, for example, the second cluster 204. The first service may be the first service 216, and includes a plurality of pods, such as the first pod 220 and the second pod 222. Each pod is to handle a subset of service requests received by the first service. Further, an IP address corresponding to the first service is allocated to the second cluster to direct service requests related to the first service to the second cluster.

At block 406, the first service is moved from the second cluster to the first cluster. In an example, such a movement is facilitated by changing a selector for each pod of the plurality of pods from the second cluster to the first cluster. The selector for a pod may be indicative of a cluster in which the pod is to be hosted, as explained earlier.

At block 408, the IP address corresponding to the first service is reallocated to the first cluster. This ensures that the first service continues to receive service requests directed to the first service even after its movement to the first cluster.

In an example, prior to the movement of the first service to the first cluster, the first service is hosted in a second computing node of the second cluster. Further, the method includes selecting a first computing node of the first cluster as suitable for hosting the first service. Subsequently, the first service is moved from the second computing node to the first computing node. The selection of the first computing node may be performed based on a resource utilization of each computing node of the first cluster. The resource utilization includes at least one of processor utilization and memory utilization. Further, an external service is selected from among a plurality of external services hosted in clusters different from the first cluster. The selections are explained with reference to FIG. 5.

FIG. 5 illustrates a method 500 for selecting a computing node to host the additional service and selection of the additional service from the plurality of external services, according to an example implementation of the present subject matter.

At block 502, resource utilization of each computing node of the first cluster is monitored. The monitoring may be performed with the help of the instructions 304, as explained earlier.

At block 504, from the computing nodes of the first cluster, a first computing node may be selected for hosting the additional service. Such a selection may be based on a resource utilization of each computing node of the first cluster. For example, the first computing node may be selected because its resource utilization is the lowest among all the computing nodes of the first cluster.

At block 506, resource consumption of the plurality of external services is monitored. Such a monitoring may be performed with the help of the instructions 310, as explained earlier.

At block 508, the first service is identified from the plurality of external services as the additional service. Such an identification may be based on the resource utilization of the first computing node and the resource consumption of each external service of the plurality of additional services. For the identification, a cumulative resource utilization for each external service may be computed, as explained earlier.

Figure 6:
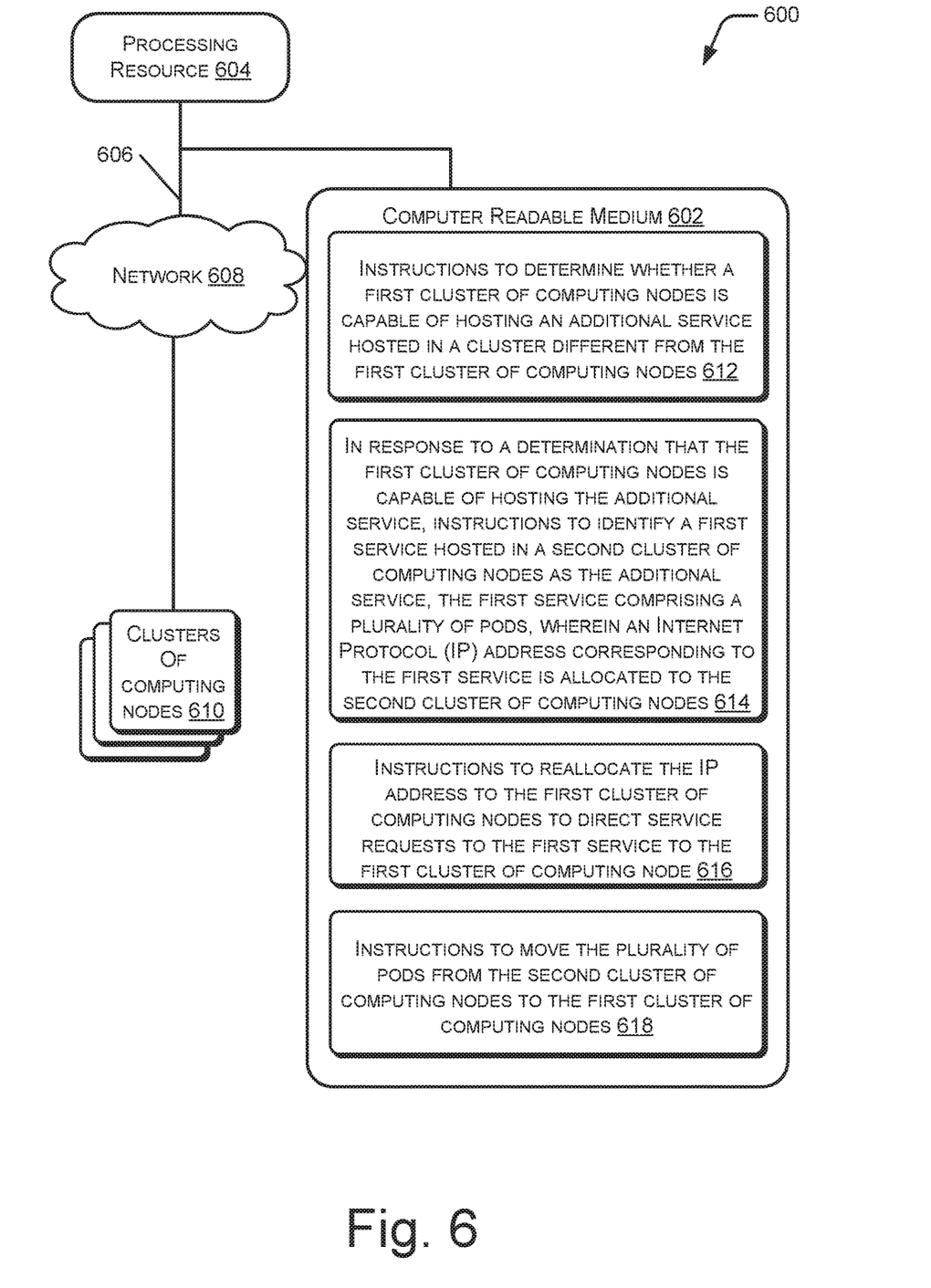
FIG. 6 illustrates a computing environment, implementing a non-transitory computer-readable medium for facilitating movement of services across clusters, according to an example implementation of the present subject matter.

FIG. 6 illustrates a computing environment 600, implementing a non-transitory computer-readable medium 602 for movement of services across clusters, according to an example implementation of the present subject matter.

In an example, the non-transitory computer-readable medium 602 may be utilized by a system, such as the system 100. In an example, the computing environment 600 may include a processing resource 604 communicatively coupled to the non-transitory computer-readable medium 602 through a communication link 606.

In an example, the processing resource 604 may be implemented in a system, such as the system 100. The processing resource 604 may be the processor 102. The non-transitory computer-readable medium 602 may be, for example, an internal memory device or an external memory device. In an implementation, the communication link 606 may be a direct communication link, such as any memory read/write interface. In another implementation, the communication link 606 may be an indirect communication link, such as a network interface. In such a case, the processing resource 604 may access the non-transitory computer-readable medium 602 through a network 608. The network 608 may be a single network or a combination of multiple networks and may use a variety of different communication protocols.

The processing resource 604 and the non-transitory computer-readable medium 602 may also be communicatively coupled to a several clusters of computing nodes 610 over the network 608. The clusters of computing nodes 610 may include, for example, the first cluster 202, second cluster 204, and third cluster 206.

In an example implementation, the non-transitory computer-readable medium 602 includes a set of computer-readable instructions to facilitate movement of services across clusters.

Referring to FIG. 6, in an example, the non-transitory computer-readable medium 602 includes instructions 612 that cause the processing resource 604 to determine whether a first cluster of computing nodes is capable of hosting an additional service hosted in a cluster different from the first cluster of computing nodes. The first cluster of computing nodes may be interchangeably referred to as first cluster, and may be, for example, the first cluster 202. In an example, the first cluster may be part of a private cloud, such as the first cloud 250, that is accessible by a specific set of users. The determination of whether the first cluster can host the additional service may be performed based on a determination of whether a resource utilization of the first cluster is lesser than a threshold, as explained earlier.

The non-transitory computer-readable medium 602 includes instructions 614 that cause identification of a first service hosted in a second cluster of computing nodes as the additional service in response to a determination that the first cluster can host the additional service. The first service may be, for example, the first service 216, and may include a plurality of pods. Further, an IP address corresponding to the first service is allocated to the second cluster of computing nodes, hereinafter referred to as the second cluster. The second cluster may be the second cluster 204. Further, in an example, the second cluster may be part of a public cloud, such as the second cloud 252, that is publicly accessible.

The non-transitory computer-readable medium 602 includes instructions 616 that cause the processing resource 604 to reallocate the IP address to the first cluster to direct service requests to the first service to the first cluster. Further, non-transitory computer-readable medium 602 includes instructions 618 that cause the processing resource 604 to move the plurality of pods from the second cluster to the first cluster.

The present subject matter enables dynamic redistribution of services across clusters. Since a service is automatically moved from the second cluster to the first cluster when the first cluster becomes capable of hosting an additional service, the first cluster can be utilized to its fullest extent. Therefore, a cluster that is superior compared to other clusters in terms of various factors, such as security, quality of service, cost-effectiveness, and latency, can be utilized to host the maximum possible number of services at all times.

The present subject matter can be utilized in cases when the services are load balancer services, each having several pods for carrying out service requests allocated to the services. For instance, by reallocating IP addresses corresponding to the services and changing the selector for pods of the services, the present subject matter facilitates the dynamic redistribution in the case of the load balancer services.

Although implementations of movement of services across clusters have been described in language specific to structural features and/or methods, it is to be understood that the present subject matter is not necessarily limited to the specific features or methods described. Rather, the specific features and methods are disclosed and explained as example implementations.

We claim:

1. A system comprising:
a processor; and
a memory coupled to the processor and storing instructions executable by the processor to:
determine whether a first cluster of computing nodes is capable of hosting an additional service hosted in a cluster different from the first cluster of computing nodes, the determination based on a resource utilization of the first cluster of computing nodes;
in response to a determination that the first cluster of computing nodes is capable of hosting the additional service, identify a first service hosted in a second cluster of computing nodes as the additional service, the first service comprising a first pod to handle a subset of service requests received by the first service, wherein an Internet Protocol (IP) address corresponding to the first service is allocated to the second cluster of computing nodes;
reallocate the IP address from the second cluster of computing nodes to the first cluster of computing nodes to direct service requests related to the first service to the first cluster of computing nodes; and
change a selector for the first pod from the second cluster of computing nodes to the first cluster of computing nodes, the selector for the first pod indicative of a cluster in which the first pod is to be hosted, to move the first pod from the second cluster of computing nodes to the first cluster of computing nodes.

2. The system of claim 1, wherein the second cluster of computing nodes is part of a public cloud and the first cluster of computing nodes is part of a private cloud, the public cloud being publicly accessible and the private cloud accessible to a specific set of users.

3. The system of claim 1, wherein
the first service is a load balancer service and comprises a plurality of pods, the first pod being one of the plurality of pods, and
the first service is to allocate a service request received by the first service to a pod of the plurality of pods.

4. The system of claim 3, wherein
each of the plurality of pods comprises a plurality of containers, and
the instructions are executable by the processor to change selector for each of the plurality of pods,
in response to the change of the selector for each of the plurality of pods, the instructions are executable by the processor to move the plurality of containers of each of the plurality of pods from the second cluster of computing nodes to the first cluster of computing nodes.

5. The system of claim 1, wherein the instructions are executable by the processor to identify a first computing node in the first cluster of computing nodes to which the first service is to be moved based on resource utilization of each computing node of the first cluster of computing nodes.

6. The system of claim 5, wherein, to identify the first service, the instructions are executable by the processor to select the first service from a plurality of external services, each external service of the plurality of external services being hosted in a cluster different from the first cluster of computing nodes, based on a resource consumption of each external service of the plurality of external services and the resource utilization of the first computing node.

7. The system of claim 6, wherein
the resource consumption of each external service of the plurality of external services comprises processor consumption and memory consumption of the external service,
the instructions are executable by the processor to compute the processor consumption of the external service based on a number of service requests received for an IP address corresponding to the external service and an average processor consumption per service request, and
the instructions are executable to compute the memory consumption of the external service based on a number of service requests received for the IP address corresponding to the external service and an average memory consumption per service request.

8. The system of claim 6, wherein the instructions are executable by the processor to:
for each external service of the plurality of external services, compute a sum of the resource consumption of the external service with the resource utilization of the first computing node; and
identify an external service for which the sum of its resource consumption and the resource utilization of the first computing node is lesser than a threshold as the first service.

9. The system of claim 1, wherein,
prior to reallocation of the IP address corresponding to the first service, the first service is hosted in a second computing node of the second cluster of computing nodes and the IP address corresponding to the first service is allocated to the second computing node, and
to reallocate the IP address, the instructions are executable to update a Virtual Router Identifier (VRID)-to-IP map, the VRID-to-IP map indicating IP addresses allocated to each computing node in the first cluster of computing nodes and each computing node in the second cluster of computing nodes.

10. The system of claim 1, comprising:
the first cluster of computing nodes to:
monitor resource utilization of each computing node of the first cluster of computing nodes; and
the second cluster of computing nodes to:
monitor resource consumption of each service hosted in the second cluster of computing nodes.

11. The system of claim 1, wherein
the instructions are executable to select a cluster from which the additional service is to be identified from a plurality of clusters different from the first cluster of computing nodes,
each cluster of the plurality of clusters is to host an external service,
each cluster of the plurality of clusters has a corresponding hosting cost for hosting a service, and
the instructions are executable to select the cluster based on the corresponding hosting cost of each cluster.

12. A method comprising:
determining, by a processing resource, whether a first cluster of computing nodes is capable of hosting an additional service that is hosted in a cluster different from the first cluster of computing nodes;
in response to the determination that the first cluster of computing nodes is capable of hosting the additional service, identifying, by the processing resource, a first service hosted in a second cluster of computing nodes as the additional service, the first service comprising a plurality of pods, wherein each pod of the plurality of pods is to handle a subset of service requests received by the first service and wherein an Internet Protocol (IP) address corresponding to the first service allocated to the second cluster of computing nodes to direct service requests related to the first service to the second cluster of computing nodes;
moving, by the processing resource, the first service from the second cluster of computing nodes to the first cluster of computing nodes, the moving including changing a selector for each pod of the plurality of pods from the second cluster of computing nodes to the first cluster of computing nodes, wherein the selector for each pod is indicative of in which cluster the pod is to be hosted; and
reallocating, by the processing resource, the IP address corresponding to the first service to the first cluster of computing nodes.

13. The method of claim 12, wherein,
prior to movement of the first service, the first service is hosted in a second computing node of the second cluster of computing nodes, and
the method comprises:
  selecting a first computing node of the first cluster of computing nodes as suitable for hosting the first service; and
  moving the first service from the second computing node to the first computing node.

14. The method of claim 13, comprising selecting the first computing node based on a resource utilization of each computing node of the first cluster of computing nodes, the resource utilization comprising at least one of processor utilization and memory utilization.

15. The method of claim 14, comprising:
monitoring the resource utilization of each computing node of the first cluster of computing nodes;
monitoring resource consumption of a plurality of external services, each external service of the plurality of external services hosted in a cluster different from the first cluster of computing nodes; and
identifying the first service from the plurality of external services based on the resource utilization of the first computing node and the resource consumption of each external service of the plurality of external services.

16. The method of claim 12, wherein determining whether the first cluster of computing nodes is capable of hosting an additional service comprises determining whether a resource utilization of the first cluster of computing nodes is lesser than a threshold.

17. A non-transitory computer-readable medium comprising instructions for moving services across clusters, the instructions being executable by a processing resource to:
determine, based on a resource utilization of a first cluster of computing nodes, whether the first cluster of computing nodes is capable of hosting an additional service hosted in a cluster different from the first cluster of computing nodes;
in response to a determination that the first cluster of computing nodes is capable of hosting the additional service, identify a first service hosted in a second cluster of computing nodes as the additional service, the first service comprising a plurality of pods including a first pod to handle a subset of service requests received by the first service, wherein an Internet Protocol (IP) address corresponding to the first service is allocated to the second cluster of computing nodes;
reallocate the IP address to the first cluster of computing nodes to direct service requests to the first service to the first cluster of computing nodes; and
move the plurality of pods from the second cluster of computing nodes to the first cluster of computing nodes, wherein to move the plurality of pods includes changing a selector for the first pod from the second cluster of computing nodes to the first cluster of computing nodes, the selector for the first pod indicative of in which cluster the first pod is to be hosted, to move the first pod from the second cluster of computing nodes to the first cluster of computing nodes.

18. The non-transitory computer-readable medium of claim 17, to determine whether the first cluster of computing nodes is capable of hosting the additional service, the instructions are executable by the processing resource to determine whether a resource utilization of the first cluster of computing nodes is lesser than a threshold.

19. The non-transitory computer-readable medium of claim 17, wherein the second cluster of computing nodes is a public cloud and the first cluster of computing nodes is a private cloud, the public cloud being publicly accessible and the private cloud accessible to a specific set of users.

* * * * *